US012722398B2

(12) United States Patent
Steurrys et al.

(10) Patent No.: US 12,722,398 B2
(45) Date of Patent: Sep. 1, 2026

(54) MISSING JET DETECTION FOR PRECOAT SOLUTION IN INK JET PRINTING SYSTEMS AND METHODS THEREOF

(71) Applicant: XEROX CORPORATION, Norwalk, CT (US)

(72) Inventors: Christine A. Steurrys, Williamson, NY (US); Mark C. Petropoulos, Webster, NY (US); Peter M. Gulvin, Webster, NY (US); Jorge A. Alvarez, Webster, NY (US); Jason M. LeFevre, Penfield, NY (US); Varun Sambhy, Pittsford, NY (US); Seemit Praharaj, Webster, NY (US); Anthony S. Condello, Webster, NY (US); Brian Lindstrom, Victor, NY (US); Palghat S. Ramesh, Pittsford, NY (US); Douglas K. Herrmann, Webster, NY (US); Robert E. Rosdahl, Jr., Ontario, NY (US)

(73) Assignee: XEROX CORPORATION, Norwalk, CT (US)

( * ) Notice: Subject to any disclaimer, the term of this patent is extended or adjusted under 35 U.S.C. 154(b) by 165 days.

(21) Appl. No.: 18/656,039

(22) Filed: May 6, 2024

(65) Prior Publication Data

US 2025/0340067 A1 Nov. 6, 2025

(51) Int. Cl.

| | |
|---|---|
| ***B41J 2/21*** | (2006.01) |
| ***B41J 11/00*** | (2006.01) |
| ***H04N 1/00*** | (2006.01) |

(52) U.S. Cl.

CPC ........... *B41J 2/2142* (2013.01); *B41J 2/2114* (2013.01); *H04N 1/00029* (2013.01); *B41J 11/00216* (2021.01); *B41J 11/0022* (2021.01)

(58) Field of Classification Search

CPC .. B41J 2/2142; B41J 2/2114; B41J 11/00216; B41J 11/0022; B41J 11/0015; B41J 11/002; H04N 1/00029

See application file for complete search history.

(56) References Cited

U.S. PATENT DOCUMENTS

| | | | |
|---|---|---|---|
| 7,690,746 | B2 | 4/2010 | Mantell et al. |
| 8,506,038 | B2 | 8/2013 | Mizes et al. |
| 8,602,518 | B2 | 12/2013 | Mizes et al. |
| 8,882,236 | B1 | 11/2014 | Kroon |
| 2004/0135837 | A1 | 7/2004 | Kramer |
| 2009/0237434 | A1 | 9/2009 | Mantell et al. |

(Continued)

*Primary Examiner* — Bradley W Thies

(74) *Attorney, Agent, or Firm* — MH2 Technology Law Group LLP

(57) ABSTRACT

A method for detecting missing jets in a precoat solution application system of an ink jet printing system includes providing print media into a path of a printer having a precoat application system, passing the print media past the precoat application system, passing print media in proximity to an ink jet printhead, jetting a plurality of drops of a first ink onto the print media to form a solid patch on a first surface of the print media, passing the print media through a dryer to dry the solid patch of the first ink on the first surface of the print media, passing the print media in proximity to the precoat application system, applying a precoat solution onto the dried solid patch of ink on the first surface of the print media, and analyzing the print media. An ink jet printing system is also disclosed.

18 Claims, 3 Drawing Sheets

(56) References Cited

U.S. PATENT DOCUMENTS

2011/0249051 A1 10/2011 Chrétien et al.
2011/0273502 A1 11/2011 Eun et al.
2011/0279504 A1 11/2011 Mizes
2012/0249658 A1* 10/2012 Murai .................. B41J 2/16579 347/19
2012/0313989 A1 12/2012 Mantell et al.
2013/0021398 A1 1/2013 Mizes et al.
2014/0139578 A1 5/2014 Mizes et al.
2014/0139583 A1 5/2014 Kammerzell
2014/0368571 A1* 12/2014 Boland .................. B41J 2/2114 347/19
2015/0077452 A1 3/2015 Ebisawa
2016/0075146 A1 3/2016 Akiyama et al.
2017/0217160 A1 8/2017 Daniell et al.
2019/0315129 A1* 10/2019 McConville ......... B41M 5/0064
2021/0300100 A1* 9/2021 Van Dijkman ........ C09D 11/40

* cited by examiner

MISSING JET DETECTION FOR PRECOAT SOLUTION IN INK JET PRINTING SYSTEMS AND METHODS THEREOF

TECHNICAL FIELD

The present teachings relate generally to precoat solutions in ink jet printing systems and, more particularly, to missing jet detection in precoat solution applications using printheads.

BACKGROUND

Digital aqueous ink jet (AIJ) printing is an area of growth for several production class printing systems. Printers or consumers of printed materials making or considering a transition from a dry powder (electrophotographic) printing system to an acoustic ink jet printing system or printing press require the maintenance of existing image quality (IQ) and print permanence and durability characteristics while reducing run cost per kiloprint (kp). Exemplary printing systems using the aqueous ink jet printing methods have significantly improved print image quality matching or exceeding current electrophotographic printing methods.

The image quality of aqueous ink images printed onto various types of media varies according to the type of media being printed. Image quality is typically exemplary when the aqueous ink is printed onto offset coated, non-glossy media because the ink remains on top of the coating. Aqueous ink printing onto uncoated, porous media, however, produces washed out, poorer quality images because the inks are absorbed into the fibers of the paper. To avoid this consequence, coatings can be applied to porous media to reduce the absorption of the inks into the media. Primers, also known as precoat solutions, reduce the interaction of the inks with the media since the primer is interposed between the media and the inks. Because the ink image is fixed to the primer layer rather than the media, the ink image can be more easily removed. The ease of ink image removal from media is a significant factor in recycling printed media.

Therefore, it is desirable to develop or design methods or systems to improve image quality, gamut, and deinkability of AIJ prints on uncoated media, which could be a valuable product feature or add-on that opens new opportunities and use of aqueous based ink jet printing systems, while maintaining consistent performance. The use of various precoat solution delivery methods require reliable methods of continuous application of precoat solutions and determining issues in the precoat delivery.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for detecting missing jets in a precoat solution application system of an ink jet printing system is disclosed. The method also includes providing print media into a path of a printer having a precoat application system. The method also includes passing the print media past the precoat application system. The method also includes passing the print media in proximity to an ink jet printhead, jetting a plurality of drops of a first ink onto the print media to form a solid patch of the first ink on a first surface of the print media, passing the print media through a dryer to dry the solid patch of the first ink on the first surface of the print media, passing the print media in proximity to the precoat application system, applying a precoat solution onto the dried solid patch of ink on the first surface of the print media, and analyzing the print media to determine a presence of a defect in the application of the precoat solution. Implementations of the method for detecting missing jets in a precoat solution application system can include where the precoat application system includes a printhead configured to jet individual drops of precoat solution onto print media. Applying a precoat solution onto the print media to form a solid patch of ink on a first surface of the print media including applying the precoat solution in a predetermined target pattern. Analyzing the print media to determine a presence of a defect in the application of the precoat solution may include scanning a top surface of the print media to capture an image of the surface of the print media. A scanner can be integrated into a media path of the ink jet printing system. Analyzing the print media further may include comparing an intended area of precoat solution application with the actual result of precoat solution applied to the dried solid patch of ink. The method for detecting missing jets in a precoat solution application system may include viewing the print media with the solid ink patch and the applied precoat solution through a color filter. The method for detecting missing jets in a precoat solution application system may alternately include viewing the print media with the solid ink patch and the applied precoat solution through a color filter using a light source. The method for detecting missing jets in a precoat solution application system may include evaluating the print media to determine a delta L* value or a color density value. Analyzing the print media to determine a presence of a defect further may include determining a visual change in ink appearance after application of the precoat solution. A precoat solution composition in the precoat application system may include 5% wt to 40% wt of a salt in an aqueous solution based on a total weight of the aqueous solution. Implementations of the described method may include the use of hardware, a method or process, or computer software on a computer-accessible medium.

Another method for detecting missing jets in a precoat solution application system of an ink jet printing system is disclosed. The method includes providing print media into a path of a printer which includes a precoat application system. The method also includes passing the print media past the precoat application system may include a printhead configured to jet individual drops of precoat solution onto print media. The method also includes passing the print media in proximity to an ink jet printhead, jetting a plurality of drops of a first ink onto the print media to form a solid patch of the first ink on a first surface of the print media, passing the print media through a dryer to dry the solid patch of the first ink on the first surface of the print media, passing the print media in proximity to the precoat application system, applying a precoat solution onto the dried solid patch of ink on the first surface of the print media, and analyzing the print media to determine a presence of a defect in the application of the precoat solution. Implementations of the method for detecting missing jets in a precoat solution application system where applying a precoat solution onto the print media to form a solid patch of ink on a first surface of the print media may include applying the precoat solution in a predetermined target pattern. Analyzing the print media to determine a presence of a defect in the application of the precoat solution may include scanning a top surface of the print media to capture an image of the surface of the print media. A scanner is integrated into a media path of the ink jet printing system. The method for detecting missing jets in a precoat solution application system may include viewing the print media with the solid ink patch and the applied precoat solution through a color filter or a light source. The method for detecting missing jets in a precoat solution application system may include evaluating the print media to determine a delta l* value or a color density value. A precoat solution composition in the precoat application system may include 5% wt to 40% wt of a salt in an aqueous solution based on a total weight of the aqueous solution.

An ink jet printing system is disclosed, including a print media path configured to transport print media through the ink jet printing system. The ink jet printing system also includes a precoat solution application system having a printhead configured to jet individual drops of precoat solution onto print media. The ink jet printing system also includes at least one ink jet printhead configured to jet individual drops of ink onto print media. The ink jet printing system also includes an inline scanner configured to capture an image of a top surface of print media. The ink jet printing system also includes a dryer configured to dry one or more of individual drops of ink onto print media. The ink jet printing system also includes a print media path configured to transport print media in proximity to the precoat application system, the at least one ink jet printhead, and the inline scanner. Implementations of the ink jet printing system where the precoat solution may include 5% wt to 40% wt of a salt in an aqueous solution based on a total weight of the aqueous solution.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
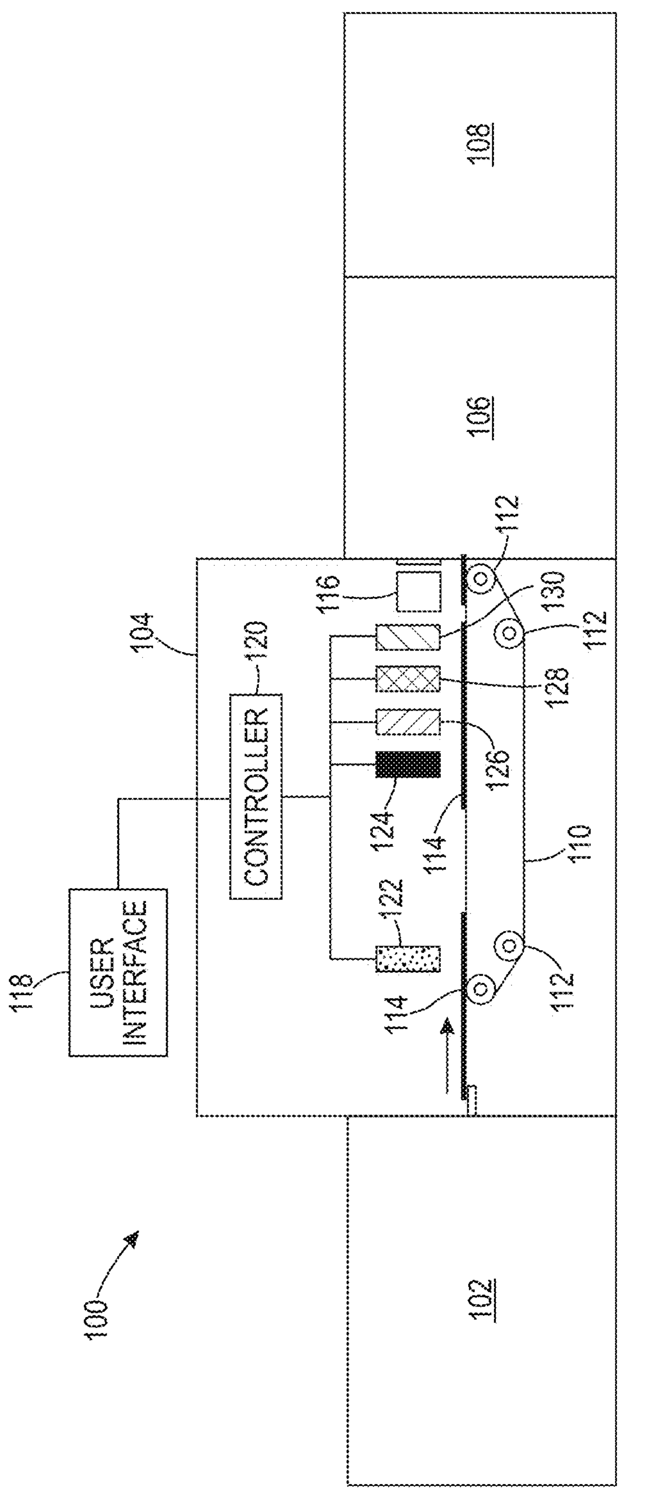
FIG. 1 is a schematic diagram of a system and method for pre-coating paper prior to ink jet printing, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

The apparatus and methods of the present disclosure solves the problem of diagnosing and detecting inconsistent deposition of primer or pre-coat solution in an aqueous ink jet printing system, where primer or precoat is used to improve print quality and de-inkability in production ink jet printing presses. To address this issue, a method and system are proposed to run a diagnostic sheet having a specific printed pattern through an ink jet printing system through a system capable of depositing a precoat solution with the use of an inkjet printhead. The precoat solution, also referred to as a precoat composition, precoat, primer, or primer solution, can include an aqueous salt solution that improves ink adhesion and de-inkability by "crashing" or precipitating the ink pigment portion of the ink composition and preventing it from sinking or diffusing into the bulk of the paper. As used herein, the term "primer" or "precoat" can be defined as coatings or solutions that are applied to media to improve the image quality of the ink images over that which is achieved without the coatings. The use of a salt solution as a precoat solution has several advantages, including low material cost and the ability to improve print quality on both coated and uncoated paper. The effect of "crashing," precipitating, or causing the precipitation of a component of an ink can include any single chemical or combination of chemicals in relation to a printed ink or other printing related fluid that can facilitate the desolubilization or precipitation of one or more components in the ink. The desolubilizing can be accomplished by proton transfer from collision or close proximity of a crashing agent with one or more of the ink components. The desolubilizing can be caused by component associations induced by a combination of a precoat solution and/or component associations occurring with the precoat solution.

The mechanism by which the precoat solution crashes or causes the precipitation of the ink pigments at the surface is alternatively reasoned to be via the breaking of the surface tension of the ink which causes the pigments, dyes, or other components to precipitate and adhere to the surface of the paper. The use of an inkjet print head to deposit a primer solution provides a uniform and consistent coating of the solution on the paper, thus ensuring that the solution sufficiently covers all areas of the paper.

The present disclosure provides the use of a diagnostic sheet of paper or other media, sent past a pre-coat color station, without application of a pre-coat solution, to be subsequently printed on by a color ink jet print head. While any color may be used for the method of the present disclosure, a higher contrast color is preferable. In examples, yellow, a high contrast color, may be used. A color contrast can be defined as a difference in brightness between a specific color in an image or text, such as yellow, when viewed in comparison to the same color with wet primer printed on top of it in an image or text. The yellow or color print station provides a solid patch in an area where the pre-coat alignment and/or missing jet target is designed to be printed. After a solid patch is printed, the patch is dried by the machine dryer or by other means, such as environmental drying. Next, the diagnostic paper or media sheet is sent back through the duplex path of the printing system without inversion. A pre-coat alignment and/or missing jet target pattern is then printed or applied by the pre-coat print station on top of the solid patch. As the diagnostic paper or sheet passes under the IIM sensor where the printed target is scanned for analysis. The IIM (Image Input Module) is a full width array image sensor with an LED lamp. It provides diagnostic data from scanned test pattern to the IBC for analysis. Image based control (IBC) software identifies the location of pre-coat printed dashes or other features from each nozzle using the contrast between the freshly coated "wet" ink and the previously printed dried ink. Automated or inline scanning can further help mitigate some of the potential challenges associated with using colorimetric indicators, including the optimization of target patterns and coating conditions.

In the present teachings, the terms "xdp" (x-dot position) and "ydp" (y-dot position) refer to a position of a dot, or pixel as jetted by one or more of a plurality of jets in a printhead in the examples of the present disclosure. The manipulation and understanding of these concepts are integral to the detection and correction of dots generated by mis-directed jets during ink jet printing of the primer or precoat solution. An error in x-dot position means jets are printing too close to each other in the cross-process direction, or relative to a width of the media. If the misdirection is greater than a specified threshold, the software can automatically disable the jet and add it to the missing jet list within the system or otherwise record the presence of one or more missing or misdirected jets. An error in xdp can be corrected by using neighboring pixels jetted from neighboring jets to add extra drops from a neighbor to accommodate for the missing or misdirected dot. Y-dot position refers to irregularities relative to an in-process direction and can be adjustable by changing the firing timing of the individual jets in one or more printheads. This does not necessarily require additional jetting from an adjacent or neighboring jet. When the diagnostic sheet or media of the present disclosure is measured, a jet is missing if the observed or measured drop of the jet is too far away from its centroid, also known to be an intended target location. An additional correction step could include alignment of a printhead relative to one another. An entire printhead can be adjusted in an x-direction (known as stitch), y-direction (device offset adjustment-timing, which moves the entire image for the head), roll (angle of head), or a combination thereof. This is also a procedure that can be conducted when a printhead is replaced. For the purposes of the present disclosure, these adjustments or corrections would be conducted on the primer printhead. They can normally be conducted on the other printheads containing and ejecting ink droplets, but the results of the present diagnostic method and system can be used to perform one or more of these alignment operations on the primer printhead, if necessary, or when changing out to a new printhead for primer deposition. Examples of the present disclosure can further include disabling one or more jets if the presence or location of precoat solution identified on the diagnostic sheet is different than an expected presence or location, or correcting a jetting operation of one or more of the individual jets if the presence or location of precoat solution identified on the diagnostic sheet is different than an expected presence or location. As mentioned previously and further described herein, a correction can include supplementing jetting using one or more additional jets, adjusting a timing of one or more individual jets, or a combination thereof.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto different types of media to form ink images.

FIG. 1 is a schematic diagram of a system and method for pre-coating paper prior to ink jet printing, in accordance with the present disclosure. The system and method for pre-coating paper prior to ink jet printing can be integrated in entirety, or in part, into a high-speed color inkjet printer 100. The system and method of the present disclosure includes a method of preventing contamination in printheads. FIG. 1 depicts a high-speed color inkjet printer 100 that uses a primer measuring method in conjunction with a diagnostic sheet to identify accurately the location of precoat solution or primer applied to media in the printer to enable media to be treated with primers effectively and efficiently. More specifically, the primer measuring method and diagnostic sheet can provide an indication of missing locations of application of precoat solution. As illustrated, the printer 100 is a printer that directly forms an ink image on a surface of a media sheet stripped from one of the supplies of media sheets stored within a paper feeder 102 and the sheets are moved through the printer 100 in a process direction 116 by a controller 120 operating one or more of the actuators that are operatively connected to rollers or to at least one driving roller of conveyor that comprise a portion of the media transport 110 that passes through the print engine module 104 of the printer. In one example, each printhead module has only one printhead that has a width that corresponds to a width of the widest media in the cross-process direction that can be printed by the printer. In other examples, the printhead modules have a plurality of printheads with each printhead having a width that is less than a width of the widest media in the cross-process direction that the printer can print. In these modules, the printheads are arranged in an array of staggered printheads or a linear array of printheads that abut one another to enable media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 100 is depicted with only two supplies of media sheets, the printer can be configured with three or more sheet supplies, each containing a different type or size of media.

With further reference to FIG. 1, the printed image exits the print engine module 104 having a print zone of printer 100 and passes under one or more image dryers 106 after the ink image is printed on a sheet, represented herein as a more generic media 114. As used in this document, the term "print zone" means an area of a media transport opposite the printheads of an inkjet printer. The image dryer 106 can include an infrared heater, a heated air blower, air returns, or combinations of these components to heat the ink image and at least partially fix an ink image to the sheet. An infrared heater applies infrared heat to the printed image on the surface of the sheet to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer. In normal printing operations, the media 114 or sheet is jetted upon with ink or primer or precoat solution in an imagewise fashion and transported through the print zone to create a multicolor image.

Prior to reaching the print zone, the media 114 passes beneath a primer application module 122. The primer application module 122 includes one or more printheads configured as described previously. In the implementation shown, there are four ink jetting printheads, but other systems may include more or less ink jetting printheads. These printheads are capable of ejecting drops of primer or pre-coat solution onto the media prior to the media being printed by the printhead modules 124, 126, 128, and 130. The location and presence of primer applied to the media 114 is measured by a detector. It should be noted that in examples, one or more of the printhead stations, including the primer, may or may not occur in any particular sequence, depending on the stage within the diagnostic method of the present disclosure. In examples, the detector can be inline and positioned within the printing system 100 or can be external to the printer 100, such that a diagnostic sheet can be evaluated offline. The signal generated by the detector can be a visual signal, perceptible by an operator, or provided to the controller 120 via an inline scanner, image analysis or detector. The controller 120 is configured with programmed instructions stored in non-transitory, computer readable media that when executed cause the controller to identify the amount and thickness of primer on the media and adjust the operation of the primer application module 122 to correct the application of the primer for the type of media being printed in normal operation, or indicate a need for a manual operation or intervention by a machine operator. The mechanism of the diagnostic sheet is described in further detail herein.

In examples of a printer 100 as shown and described herein, a return path for printing duplex, or two-sided images can be employed, as well as an accompanying duplex path and controller instructions as needed. FIG. 1 also shows the printed sheets or diagnostic media as being collected in the output module 108, but in examples, they can be directed to other processing stations (not shown) that perform tasks such as folding, collating, binding, and stapling of the media sheets.

Operation and control of the various subsystems, components and functions of the machine or printer 100 are performed with the aid of a controller or electronic subsystem (ESS) 120. The ESS or controller 120 is operatively connected to the components of the printhead modules 122, 124, 126, 128, and 130 (and thus the printheads), the detector, the image dryer 106, output module 108 and other system components not necessarily shown herein for purposes of clarity. The ESS or controller 120, for example, is a self-contained computer having a central processor unit (CPU) with electronic data storage, and a display or user interface (UI) 118. The ESS or controller 120, for example, includes a sensor input and control circuit as well as a pixel placement and control circuit. In addition, the controller 120 reads, captures, prepares, and manages the image data flow between image input sources, such as a scanning system or an online or a work station connection (not shown), and the printhead modules 122, 124, 126, 128, and 130. As such, the ESS or controller 120 is the main multi-tasking processor for operating and controlling all of the other machine subsystems and functions, including the printing process.

The controller 120 can be implemented with general or specialized programmable processors that execute programmed instructions. The instructions and data required to perform the programmed functions can be stored in non-transitory, computer readable medium associated with the processors or controllers. The processors, their memories, and interface circuitry configure the controllers to perform the operations described below when the programmed instructions are executed. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 120 from either a scanning system or an online or work station connection for processing and generation of the printhead control signals output to the printhead modules 122, 124, 126, 128, and 130. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

In examples of the present disclosure, the diagnostic system for measuring inkjet printing system performance can include at least one printhead, configured to deposit a precoat solution or primer onto a media or paper substrate, having a first surface already coated with an ink, wherein the layer of ink provides a contrast when subsequently coated with the precoat solution, and an image scanner configured to capture a discernible pattern on a surface of the media sheet after the precoat solution is deposited on the layer of ink disposed on the first surface of the substrate. In examples, the precoat solution or primer composition can include from about 5% wt to about 40% wt of a salt in an aqueous solution based on a total weight of the aqueous solution, as well as other compositional parameters or ingredients as described herein.

In examples of the present disclosure, the system for measuring inkjet printing system performance, and in particular, as performance relates to the pretreatment application consistency and quality, can include at least one printhead, configured to deposit a precoat solution or primer, a media sheet or paper, comprising a substrate having a first surface and a second surface, and a layer of material disposed on the first surface of the substrate, wherein the layer of material comprises ink and is color responsive to the precoat solution, and an image scanner configured to capture a pattern on a surface of the sheet after the precoat solution is deposited on the layer of material disposed on the first surface of the substrate. In examples, the precoat solution can include from about 5% wt to about 40% wt of a salt in an aqueous solution, as well as other compositional parameters or ingredients as described herein.

Figure 2A:
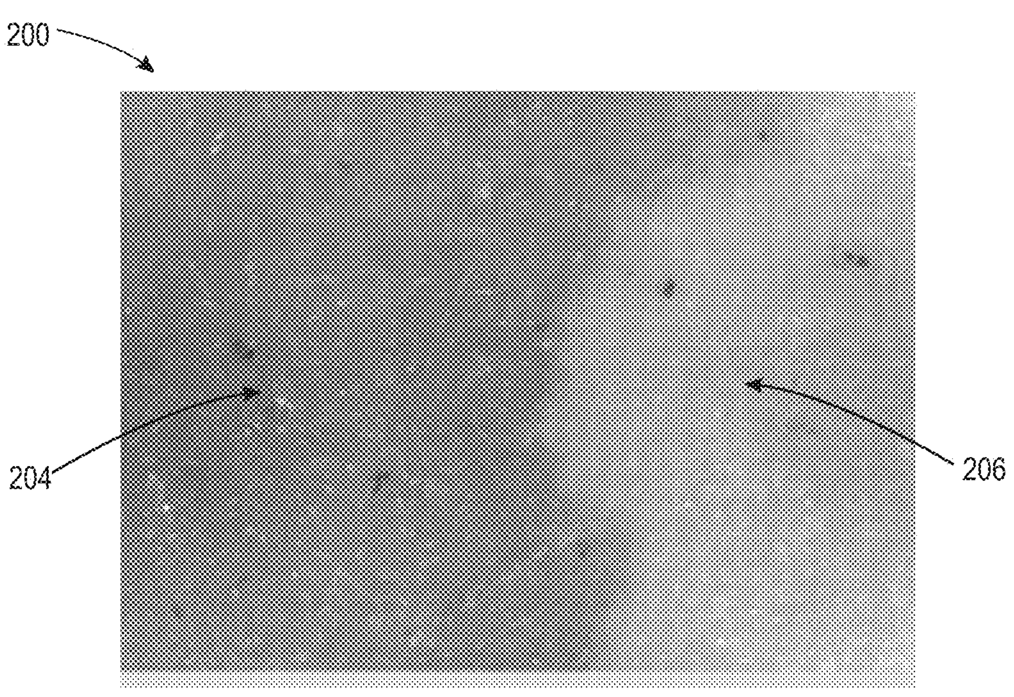
FIG. 2A is an image of a printed solid patch demonstrating visibility of clear fluid deposition, in accordance with the present disclosure.

FIG. 2A is an image of a printed solid patch demonstrating visibility of clear fluid deposition, in accordance with the present disclosure. In an example image 200 a wet portion 204 and a dry portion 206 are shown. In certain examples, the placing of a drop of clear fluid, such as water in this example, or precoat solution, also referred to as primer, on top of one or more layers of dried ink will provide a change in color as shown in the image 200. This color change is visible and the contrast can be enhanced with the use of certain ink compositions or colors, where a higher contrast can be noted between a wet and dry image. This high contrast between a dried ink image and one having a precoat solution applied or deposited onto the dried ink can be used to determine where clear primer has been deposited. It should be noted that this is primarily for diagnostic purposes.

Figure 2B:
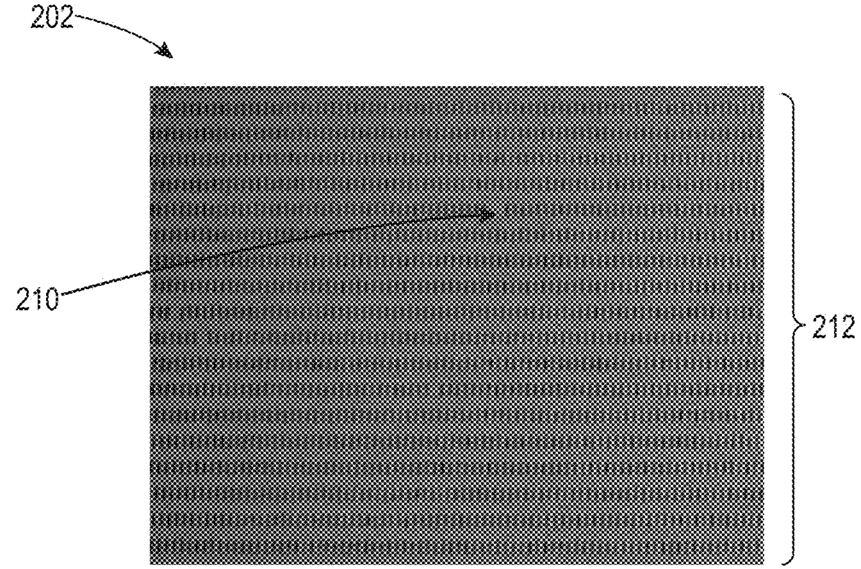
FIG. 2B is an image of a method of detecting pre-coat application, in accordance with the present disclosure.

FIG. 2B is an image of a method of detecting pre-coat application, in accordance with the present disclosure. In an example image 202 showing the method as disclosed herein, the background of the image has been printed with an ink composition and dried. Next, a missing jet target print pattern 212 of precoat or primer solution is deposited on the dried image. In this example, the pattern 212 printed is a series of parallel dashed lines, but alternate examples can include other patterns or features. As the pattern 212 provides a contrast of a wet solution on a previously dried inked image, the contrast will make apparent any missing, weak or misdirected jets. AS further shown in FIG. 2B, a missing jet location 210 is indicated within the missing jet target print pattern 212. The missing jet location 210 can be determined visibly, or by scanner. In some examples, a colorimetric scanner can be used. Additionally, with use of the IIM module as previously mentioned, resolution and lighting, lenses and color filters can be adjusted to get the maximum signal to noise.

The target pattern can be generated using software that simulates the printing process and optimizes the parameters of the target for improved detection. Once the target pattern is established, it serves as a reference for monitoring and adjusting the actual application of the precoat solution during the printing process. This allows for real-time evaluation of the uniformity and coverage of the applied precoat layer, enabling prompt detection and correction of any deviations from the intended pattern such as the missing jets as shown in FIG. 2B.

The method of detecting missing jets in a precoat solution application system can help maintain optimal printing quality and prevent issues like smudging or poor image clarity. The process involves providing print media into the printer path, which includes a precoat application system with a printhead that jets individual drops of precoat solution onto the print media. The print media is normally, under typical printing conditions, then positioned near an ink jet printhead for actual ink application. In the method, the ink is printed first. In examples, during the printing process, the inline scanner captures an image of the top surface of the print media to identify any missing jets or areas where clear pre-coat solution has not been properly applied due to missing jets, weak jets, or misdirected jets. In normal printing conditions, the printhead in the precoat application system is configured to jet individual drops of precoat solution onto the print media, ensuring even coverage across the entire surface.

The method can be adapted to work with different types of print media or paper as long as they are compatible with the precoat solution composition and printing process requirements. The presence of clear fluid on top of dried ink reveals any areas where precoat solution has not been properly applied (e.g., due to missing jets), which can be controlled or optimized for better results by adjusting the concentration and application method of the precoat solution, as well as monitoring and fine-tuning the detection process based on specific requirements.

The inline scanner captures an image of the top surface of the print media, allowing for the detection of any missing jets or other defects in the precoat application system. Any scanner that can capture high-resolution images of the print media surface can be used for this purpose. The dryer is used for drying solid patches of ink on the first surface of the print media, including methods for drying the ink droplets using heat or UV light to evaporate the solvent in the ink.

The method can involve comparing the intended area of precoat solution application with the actual result applied, evaluating criteria such as uniformity, coverage, and defects to determine if there are missing jets. Visual inspection, color filters or light sources, and evaluation of delta L* value or color density can be employed for this purpose. Delta L* is a component of a color space standard, the LAB color model, which can be used for color management and colorimetry. The LAB color model is a device-independent color model capable of representing all colors visible to the human eye. The LAB color model is based on the CIE (Commission Internationale de l'Eclairage) color space, and it defines colors in terms of lightness (L), position between red and green (a), and position between yellow and blue (b). The CIE L*a*b* color scale can be used in the present disclosure to quantify the color values of precoat materials and processes. L is an indication of the gray scale where 0 is black and 100 is white, a is an indication of the red (positive values)—green (negative values) color scale and b is an indication of the yellow (positive values)—blue (negative values) color scale.

The use of an inline scanner enables capture of an image of the top surface of the print media as it passes through the printer. The scanner analyzes for and detects any missing jets or defects in the precoat application system. By comparing the intended area of precoat solution application with the actual result applied and evaluating criteria such as uniformity, coverage, and defects, the inline scanner helps identify areas where clear pre-coat solution or primer has not been properly jetted.

In examples, detecting missing jets in a precoat solution application system can include visual inspection of the printed media, and can be accomplished by viewing diagnostic prints through a color filter or alternate light source. This approach helps to enhance or further reveal any areas where clear pre-coat solution or primer has been jetted, allowing for identification of potential missing jets. The use of a color filter or light source can also be useful when working with different types or colors of inks, as it allows for better visualization of any discrepancies between the expected and actual results. The specific type of filter or light source used may depend on factors such as the type of ink being employed and the desired level of contrast for better visualization. Color filtering may be used to drop out the background color thus enhancing the contrast of the dashes being detected.

In examples, the application of a precoat composition can be accomplished in an imagewise fashion, such as by selective ejection or spray application, or by a drop-on-demand type printhead. In an example, a print head assembly or array, or a liquid ejector can be positionable, i.e. translate across a lateral dimension (from side to side) of a paper, or movable to be further away from or closer to a surface of a paper, or addressable to actuate only specific jets to eject small drops or droplets of precoat composition a onto a surface of the paper, or be arranged in an array, in an imagewise fashion. In this context, imagewise fashion can be defined as applying a precoat formulation to approximate locations on a surface of the paper that correspond to locations on the paper where an ink ejector printhead will subsequently print an image on the same surface of the paper in a same approximate location. Each subsequent page, sheet, or section of a continuous paper web can have the same image printed upon a surface of the paper, and thus will have a precoat composition applied in the same or similar locations on a surface of the paper as the image or ink that is applied to the surface of the paper. In other examples, each subsequent page, sheet, or section of a continuous paper web can have a different or variable image printed upon a surface of the paper, and thus will have a precoat composition applied in the same or similar variable locations on a surface of the paper as the variable image or ink that is applied to the surface of the paper.

In examples, the precoat solution can include an aqueous salt solution. For example, the precoat solution can include magnesium chloride, calcium nitrate, barium, any water soluble salt of $Ca^{2+}$, $Mg^{2+}$, $Ba^{2+}$, $B^{3+}$, $Al^{3+}$, or combinations thereof. In essence, divalent or trivalent cations are the active species included in a precoat solution. They destabilize one or more of the ink components, colloids, latex, pigments, and the like, and cause them to precipitate out of suspension or dispersion within the ink composition. A representative primer, primer solution, or precoat solution composition can be found in Table 1. All values are represented in % by weight of a total precoat solution or primer composition.

TABLE 1

Representative Precoat (Primer) Solution Composition

| Chemical | Amt in 1 kg | % by wt | Suitable Range (% by wt) |
|---|---|---|---|
| Glycerol | 21.8 | 2.2 | 0-5 |
| Propylene Glycol, (can also include other cosolvents like butanediol, pentanediol, hexanediol, glycol ethers like diethylene glycol monoethyl ether, dipropylene glycol methyl ether, similar to cosolvents that may be present in ink formulations) | 197.7 | 19.8 | 10-40 |
| Water | 509 | 50.9 | 30-70 |
| Magnesium Nitrate Hexahydrate (can also include other metal salts as described herein) | 270 | 27.0 | 10-50 |
| Surfactant TT4000 | 7 | 0.7 | 0.1-3 |
| Biocide Proxel | 1.45 | 0.1 | 0.1-1 |

In an example, the precoat solution comprises a magnesium chloride solution in water, where in any case, the precoat solution can include 5% wt to 40% wt of a salt in an aqueous solution based on a total weight of the aqueous solution. Other examples include from about 1% wt to about 50% wt, or from about 10% wt to about 50% wt, or from about 10% wt to about 20% wt of a salt in an aqueous solution based on a total weight of the aqueous solution.

In examples, the precoat application system can be combined for use with a digital printer, an offset press, or a combination thereof. For example, the precoat application system can be paired in a separate module with any type of printing system. Furthermore, the precoat application system can be used to precoat paper, and then printed at a later time, which need not be immediately after precoating. The paper can include uncoated paper or coated paper, or paper in the form of one or more discrete sheets, or alternatively in a continuous web format.

Figure 3:
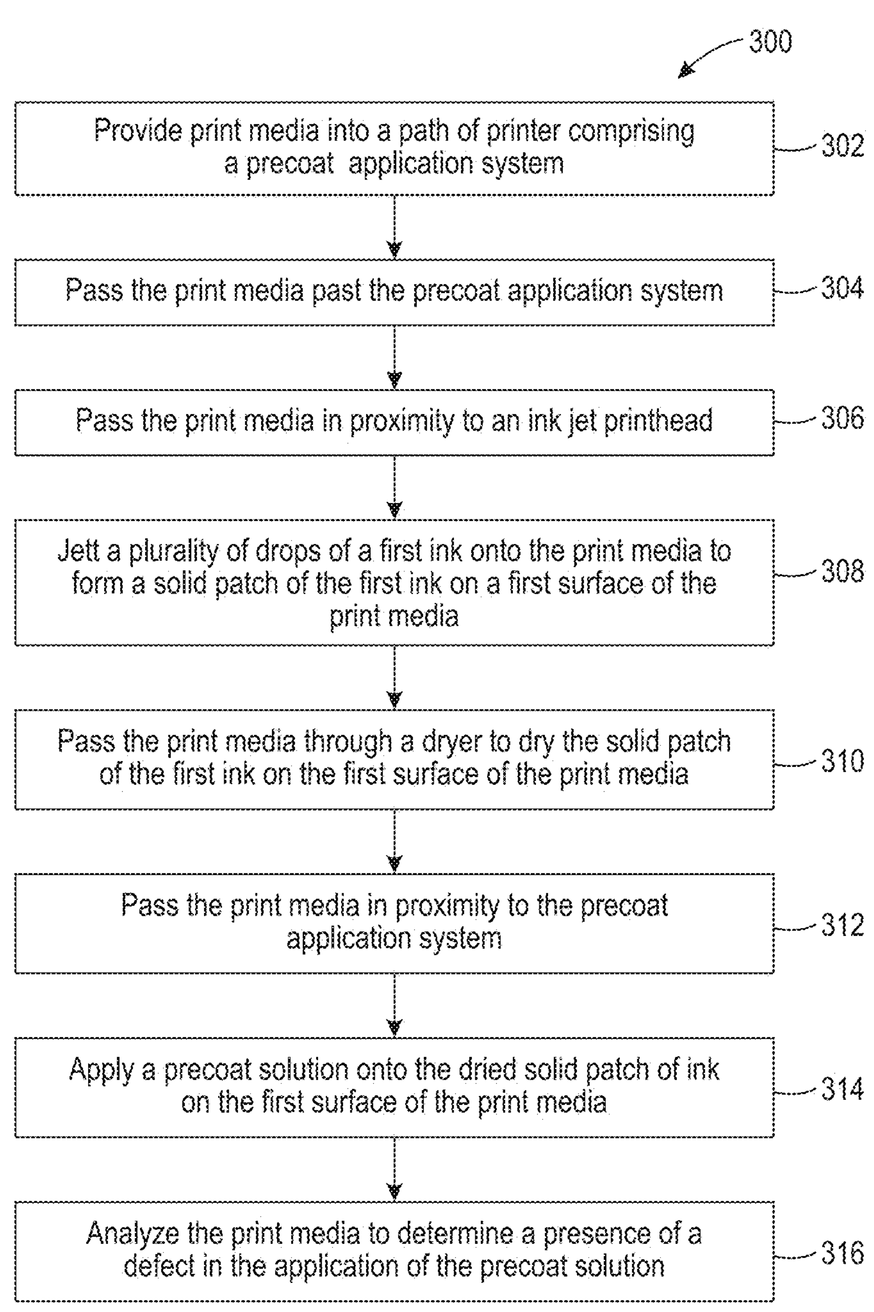
FIG. 3 is a flowchart illustrating a method for detecting missing jets in a precoat solution application system of an ink jet printing system, in accordance with the present disclosure.

FIG. 3 is a flowchart illustrating a method for detecting missing jets in a precoat solution application system of an ink jet printing system, in accordance with the present disclosure. A method for detecting missing jets in a precoat solution application system of an ink jet printing system 300 includes providing print media into a path of a printer comprising a precoat application system 302, passing the print media past the precoat application system 304, and passing the print media in proximity to an ink jet printhead 306. Next, a plurality of drops of a first ink are jetted onto the print media to form a solid patch of the first ink on a first surface of the print media 308, followed by passing the print media through a dryer to dry the solid patch of the first ink on the first surface of the print media 310. Then, the print media is passed in proximity to the precoat application system 312, followed by applying a precoat solution onto the dried solid patch of ink on the first surface of the print media 314, and analyzing the print media to determine a presence of a defect in the application of the precoat solution 316. In examples, the precoat application system includes a printhead configured to jet individual drops of precoat solution onto print media. The method for detecting missing jets in a precoat solution application system 300 can include applying a precoat solution onto the print media to form a solid patch of ink on a first surface of the print media including applying the precoat solution in a predetermined target pattern. Analyzing the print media to determine a presence of a defect in the application of the precoat solution can include scanning a top surface of the print media to capture an image of the surface of the print media. The scanner can be integrated into a media path of the ink jet printing system. Alternatively, the scanner may be external relative to the media path, or the printing system altogether. In certain examples, analyzing the print media further includes a comparison of an intended area of precoat solution application with the actual result of precoat solution applied to the dried solid patch of ink. The method 300 can in include viewing the print media with the solid ink patch and the applied precoat solution through a color filter or with the supplemental use of a light source. Evaluation of the print media can include determining a delta L* value or a color density value or determining a visual change in the ink appearance after application of the precoat solution. The method for detecting missing jets in a precoat solution application system 300 can include the depositing of a quantity of a colorless precoat solution on a top surface of the diagnostic sheet comprising jetting a plurality of drops of precoat solution using a printhead comprising a plurality of individual jets, or disabling one or more jets if the presence or location of precoat solution identified on the diagnostic sheet is different than an expected presence or location.

A typical inkjet printer uses one or more printheads. Each printhead typically contains an array of individual nozzles, or jets, for ejecting drops of ink across an open gap to an image receiving member to form an image. In examples of the present disclosure, an additional printhead can be added to the printing system to deposit a primer or precoat solution prior to or after the deposition of one or more colors of ink. The image receiving member may be a continuous web of recording media, a series of media sheets, or the image receiving member may be a rotating surface, such as a print drum or endless belt. Images printed on a rotating surface are later transferred to recording media by mechanical force in a transfix nip formed by the rotating surface and a transfix roller. In an inkjet printhead, individual piezoelectric, thermal, or acoustic actuators generate mechanical forces that expel ink through an orifice from an ink filled conduit in response to an electrical voltage signal, sometimes called a firing signal. The magnitude, or voltage level, of the signals affects the amount of ink ejected in each drop. The firing signal is generated by a printhead controller in accordance with image data. An inkjet printer forms a printed image in accordance with the image data by printing a pattern of individual ink drops at particular locations on the image receiving member. The locations where the ink drops landed are sometimes called "ink drop locations," "ink drop positions," or "pixels." Thus, a printing operation can be viewed as the placement of ink drops on an image receiving member in accordance with image data.

In order for the printed images to correspond closely to the image data, both in terms of fidelity to the image objects and the colors represented by the image data, the printheads must be registered with reference to the imaging surface and with the other printheads in the printer. Registration of printheads is a process in which the printheads are operated to eject ink in a known pattern and then the printed image of the ejected ink is analyzed to determine the orientation of the printhead with reference to the imaging surface and with reference to the other printheads in the printer. Operating the printheads in a printer to eject ink in correspondence with image data presumes that the printheads are level with a width across the image receiving member and that all of the inkjet ejectors in the printhead are operational. The presumptions regarding the orientations of the printheads, however, cannot be assumed, but must be verified. Additionally, if the conditions for proper operation of the printheads cannot be verified, the analysis of the printed image should generate data that can be used either to adjust the printheads so they better conform to the presumed conditions for printing or to compensate for the deviations of the printheads from the presumed conditions. It should be noted that when added to an inkjet printing system, a printhead used for the purpose of dispensing or ejecting primer follows these same principles of operation and maintains many of the same requirements, save for standard adjustments also applicable to the general printing of inks within such systems.

Analysis of printed images is performed with reference to two directions. "Process direction" refers to the direction in which the image receiving member is moving as the imaging surface passes the printhead to receive the ejected ink and "cross-process direction" refers to the direction across the width of the image receiving member. In order to analyze a printed image, a test pattern needs to be generated so determinations can be made as to whether the inkjets operated to eject ink did, in fact, eject ink and whether the ejected ink landed where the ink would have landed if the printhead was oriented correctly with reference to the image receiving member and the other printheads in the printer. In some printing systems, an image of a printed image is generated by printing the printed image onto media or by transferring the printed image onto media, ejecting the media from the system, and then scanning the image with a flatbed scanner or other known offline imaging device. This method of generating a picture of the printed image suffers from the inability to analysis the printed image in situ and from the inaccuracies imposed by the external scanner. In some printers, a scanner is integrated into the printer and positioned at a location in the printer that enables an image of an ink image to be generated while the image is on media within the printer or while the ink image is on the rotating image member. These integrated scanners typically include one or more illumination sources and a plurality of optical detectors that receive radiation from the illumination source that has been reflected from the image receiving surface. The radiation from the illumination source is usually visible light, but the radiation may be at or beyond either end of the visible light spectrum. If light is reflected by a white surface, the reflected light has the same spectrum as the illuminating light. In some systems, ink on the imaging surface may absorb a portion of the incident light, which causes the reflected light to have a different spectrum. In addition, some inks may emit radiation in a different wavelength than the illuminating radiation, such as when an ink fluoresces in response to a stimulating radiation. Each optical sensor generates an electrical signal that corresponds to the intensity of the reflected light received by the detector. The electrical signals from the optical detectors may be converted to digital signals by analog/digital converters and provided as digital image data to an image processor. While the test pattern shown and described as printed onto a diagnostic sheet in reference to FIG. 2, applies to the printing of a primer or precoat solution, the same principles relating to test patterns of ink having a visible color upon printing or ejecting apply to the present disclosure as well. It should be noted that while the primers or precoat solutions are colorless as stored and deposited, it is in combination with the surface layer of the one or more examples of diagnostic sheets as described herein that a visible or scannable or detectable colored pattern can be discerned.

The ability to differentiate dashes or other features of different ink colors, or precoat solution, provided an appropriate surface layer on a diagnostic sheet, is subject to the phenomenon of missing or weak inkjet ejectors. Weak inkjet ejectors are ejectors that do not respond to a firing signal by ejecting an amount of ink that corresponds to the amplitude or frequency of the firing signal delivered to the inkjet ejector. A weak inkjet ejector, instead, delivers a lesser amount of ink. Consequently, the lesser amount of ink or primer ejected by a weak jet covers less of the image receiving member so the contrast of the signal generated by the optical detector with reference to an uncovered portion of the image receiving member is lower. Therefore, ink drops or primer drops in a dash ejected by a weak inkjet ejector may result in an electrical signal having a magnitude that is different than that expected. Missing inkjet ejectors are inkjet ejectors that eject little or no ink in response to the delivery of a firing signal. A process for identifying the inkjet ejectors that fail to eject ink drops or primer for such test patterns is discussed in more detail below can be found in U.S. Pat. No. 8,721,033, which is incorporated by reference herein. These concepts and methods can be applied to detecting and diagnosing issues in primer or precoat solution ejection when paired with an appropriate diagnostic sheet as described herein.

The printheads may be adjusted in the cross-process direction using actuators, such as electrical motors, that are operatively connected to a printhead or to a mounting member to which a printhead is mounted. These actuators are typically electro-mechanical devices that respond to control signals that may be generated by an appropriately configured controller. In one example, each printhead may be operatively connected to an independent actuator. In alternative examples, a group of two or more printheads, typically mounted to a single printhead bar, may be operatively connected to a single actuator to enable movement of the printhead group with the single actuator. All but one of the printheads are further mechanically coupled to independent secondary actuators, with the printhead not having an independent actuator being adjusted solely by the first actuator. This arrangement allows the first actuator to adjust all of the coupled printheads simultaneously, with the secondary independent actuators providing further adjustments to their respective printheads.

Another form of printhead alignment in the cross-process direction is known as stitch alignment. Stitch alignment occurs at the interface boundaries between adjacent printheads in a print array. Many printhead configurations arrange multiple printheads on different rows in a single array to span the entire cross-process width of an image receiving member that passes through the print zone. The multiple printheads are "stitched" together to form a seamless line in the cross process direction. Stitch error arises when a gap or overlap exists between edge nozzles of neighboring heads of the same color.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for detecting missing jets in a precoat solution application system of an ink jet printing system, comprising:

providing print media into a path of a printer comprising a precoat application system;

passing the print media past the precoat application system;

passing the print media in proximity to an ink jet printhead;

jetting a plurality of drops of a first ink onto the print media to form a solid patch of the first ink on a first surface of the print media;

passing the print media through a dryer to dry the solid patch of the first ink on the first surface of the print media;

passing the print media in proximity to the precoat application system;

applying a colorless precoat solution onto the dried solid patch of ink on the first surface of the print media in a predetermined target pattern, wherein the colorless precoat solution provides a change in color as a contrast of a wet solution on a previously dried inked image; and analyzing the print media to determine a presence of a defect in the application of the precoat solution based on a level of the contrast of the wet solution on the previously dried inked image in the predetermined target pattern.

2. The method for detecting missing jets in a precoat solution application system of claim 1, wherein the precoat application system comprises a printhead configured to jet individual drops of colorless precoat solution onto print media.

3. The method for detecting missing jets in a precoat solution application system of claim 1, wherein applying a precoat solution onto the print media to form a solid patch of ink on a first surface of the print media comprises jetting a plurality of drops of a colorless precoat solution using a printhead comprising a plurality of jets in the predetermined target pattern.

4. The method for detecting missing jets in a precoat solution application system of claim 1, wherein analyzing the print media to determine a presence of a defect in the application of the precoat solution comprises scanning a top surface of the print media to capture an image of the surface of the print media.

5. The method for detecting missing jets in a precoat solution application system of claim 4, wherein a scanner is integrated into a media path of the ink jet printing system.

6. The method for detecting missing jets in a precoat solution application system of claim 1, wherein analyzing the print media further comprises comparing an intended area of colorless precoat solution application with the actual result of colorless precoat solution applied to the dried solid patch of ink.

7. The method for detecting missing jets in a precoat solution application system of claim 1, further comprising viewing the print media with the solid ink patch and the applied precoat solution through a color filter.

8. The method for detecting missing jets in a precoat solution application system of claim 1, further comprising viewing the print media with the solid ink patch and the applied precoat solution through a color filter using a light source.

9. The method for detecting missing jets in a precoat solution application system of claim 1, further comprising evaluating the print media to determine a delta L* value or a color density value.

10. The method for detecting missing jets in a precoat solution application system of claim 1, wherein analyzing the print media to determine a presence of a defect further comprises determining a visual change in ink appearance after application of the colorless precoat solution.

11. The method for detecting missing jets in a precoat solution application system of claim 1, wherein a precoat solution composition in the precoat application system comprises 5% wt to 40% wt of a salt in an aqueous solution based on a total weight of the aqueous solution.

12. A method for detecting missing jets in a precoat solution application system of an ink jet printing system, comprising:

providing print media into a path of a printer comprising a precoat application system;

passing the print media past the precoat application system comprising a printhead configured to jet individual drops of precoat solution onto print media;

passing the print media in proximity to an ink jet printhead;

jetting a plurality of drops of a first ink onto the print media to form a solid patch of the first ink on a first surface of the print media;

passing the print media through a dryer to dry the solid patch of the first ink on the first surface of the print media;

passing the print media in proximity to the precoat application system;

applying a colorless precoat solution onto the dried solid patch of ink on the first surface of the print media in a predetermined target pattern, wherein the colorless precoat solution provides a change in color as a contrast of a wet solution on a previously dried inked image; and analyzing the print media to determine a presence of a defect in the application of the colorless precoat solution based on an absence of the contrast of the wet solution on the previously dried inked image in the predetermined target pattern.

13. The method for detecting missing jets in a precoat solution application system of claim 12, wherein applying a precoat solution onto the print media to form a solid patch of ink on a first surface of the print media comprises jetting a plurality of drops of a colorless precoat solution using a printhead comprising a plurality of individual jets in the precoat solution in a predetermined target pattern.

14. The method for detecting missing jets in a precoat solution application system of claim 12, wherein analyzing the print media to determine a presence of a defect in the application of the precoat solution comprises scanning a top surface of the print media to capture an image of the surface of the print media.

15. The method for detecting missing jets in a precoat solution application system of claim 14, wherein a scanner is integrated into a media path of the ink jet printing system.

16. The method for detecting missing jets in a precoat solution application system of claim 12, further comprising viewing the print media with the solid ink patch and the applied precoat solution through a color filter or a light source.

17. The method for detecting missing jets in a precoat solution application system of claim 12, further comprising evaluating the print media to determine a delta L* value or a color density value.

18. The method for detecting missing jets in a precoat solution application system of claim 12, wherein a precoat solution composition in the precoat application system comprises 5% wt to 40% wt of a salt in an aqueous solution based on a total weight of the aqueous solution.

* * * * *